US012726738B2

(12) United States Patent
Matsubara et al.

(10) Patent No.: US 12,726,738 B2
(45) Date of Patent: Sep. 1, 2026

(54) IMAGE CAPTURING APPARATUS AND METHOD FOR CONTROLLING THE SAME

(71) Applicant: CANON KABUSHIKI KAISHA, Tokyo (JP)

(72) Inventors: Kosuke Matsubara, Tokyo (JP); Toshiharu Ueda, Tokyo (JP); Kento Iimori, Tokyo (JP); Toshiyuki Takada, Tokyo (JP); Shohei Tozawa, Kanagawa (JP); Jun Kameda, Tokyo (JP); Yohei Kanda, Kanagawa (JP); Fumihito Karahashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 72 days.

(21) Appl. No.: 18/790,152

(22) Filed: Jul. 31, 2024

(65) Prior Publication Data

US 2024/0388818 A1 Nov. 21, 2024

Related U.S. Application Data

(63) Continuation of application No. PCT/JP2023/000153, filed on Jan. 6, 2023.

(30) Foreign Application Priority Data

Feb. 25, 2022 (JP) ................................ 2022-028386
Oct. 3, 2022 (JP) ................................ 2022-159716

(51) Int. Cl.

*H04N 25/78* (2023.01)
*H04N 25/57* (2023.01)
*H04N 25/581* (2023.01)
*H04N 25/59* (2023.01)
*H04N 25/771* (2023.01)
*H04N 25/772* (2023.01)

(52) U.S. Cl.

CPC ............ *H04N 25/78* (2023.01); *H04N 25/57* (2023.01); *H04N 25/581* (2023.01);
(Continued)

(58) Field of Classification Search

None
See application file for complete search history.

(56) References Cited

U.S. PATENT DOCUMENTS 7,427,790 B2 9/2008 Parks
11,284,017 B2 * 3/2022 Yamashita .......... H04N 23/741
(Continued)

FOREIGN PATENT DOCUMENTS

JP 2015128253 A 7/2015
JP 2018061192 A 4/2018
(Continued)

OTHER PUBLICATIONS

Foreign Patent Documents #1 and 2 were cited in the International Search Report dated Mar. 28, 2023, of International Application No. PCT/JP2023/000153, which is enclosed without an English translation.

*Primary Examiner* — Twyler L Haskins
*Assistant Examiner* — Wesley J Chiu
(74) *Attorney, Agent, or Firm* — Cowan, Liebowitz & Latman, P.C.

(57) ABSTRACT

An image capturing apparatus includes a pixel portion, each of pixels including a photoelectric conversion portion, a charge-voltage conversion portion, and an expansion portion configured to expand a capacitance of the charge-voltage conversion portion, a switching unit configured to switch connection between the expansion portion and the charge-voltage conversion portion; and a read-out unit configured to amplify signals of the same pixel with a plurality of types of amplification ratios and read out the amplified signals, wherein when the read-out unit amplifies signals of the same pixel with a plurality of types of amplification ratios and reads out the amplified signals, the switching unit configures the same settings of switching the connection between the
(Continued)

| FD EXPANSION TRANSISTOR FDext | COLUMN CIRCUIT | GAIN | FD | COLUMN CIRCUIT GAIN | | TOTAL GAIN |
|---|---|---|---|---|---|---|
| | | | | COLUMN AMPLIFIER | Ramp | |
| ON | COLUMN CIRCUIT 204 | FIRST GAIN | 1 | 1 | 1 | 1 |
| | COLUMN CIRCUIT 210 | SECOND GAIN | 1 | 8 | 1 | 8 |
| OFF | COLUMN CIRCUIT 204 | SECOND GAIN | 4 | 2 | 1 | 8 |
| | COLUMN CIRCUIT 210 | THIRD GAIN | 4 | 16 | 1 | 64 |

expansion portion and the charge-voltage conversion portion, for reading out operations with the plurality of amplification ratios.

13 Claims, 7 Drawing Sheets

(52) U.S. Cl.
CPC ........... *H04N 25/59* (2023.01); *H04N 25/771* (2023.01); *H04N 25/772* (2023.01)

(56) References Cited

U.S. PATENT DOCUMENTS

| | | | | |
|---|---|---|---|---|
| 2004/0251394 | A1* | 12/2004 | Rhodes | H04N 25/59<br>348/E3.019 |
| 2011/0134267 | A1* | 6/2011 | Ohya | H04N 25/60<br>348/222.1 |
| 2015/0189210 | A1* | 7/2015 | Shimizu | H04N 23/76<br>348/294 |
| 2016/0316163 | A1* | 10/2016 | Beck | H04N 25/59 |
| 2020/0043971 | A1* | 2/2020 | Sugawa | H10D 30/601 |
| 2020/0336681 | A1* | 10/2020 | Kobuse | H04N 25/616 |
| 2022/0247945 | A1* | 8/2022 | Yoshida | H04N 25/587 |

FOREIGN PATENT DOCUMENTS

| | | | |
|---|---|---|---|
| JP | 2019047846 | A | 3/2019 |
| JP | 2019220944 | A | 12/2019 |
| JP | 2021022921 | A | 2/2021 |
| JP | 2021168460 | A | 10/2021 |
| JP | 2022505571 | A | 1/2022 |
| WO | 2007088710 | A | 8/2007 |
| WO | 2018066143 | A | 4/2018 |

* cited by examiner 100
101
SHOOTING LENS
102
IMAGE SENSOR
103
IMAGE ACQUISITION UNIT
104
IMAGE PROCESSING UNIT
105
IMAGE RECORDING UNIT
106
OPERATION UNIT
107
STORAGE UNIT
108
DISPLAY UNIT
110
SYSTEM CONTROL UNIT
111
IMAGE SENSOR CONTROL UNIT
112
LENS CONTROL UNIT 102
208
201
202
211
200
R
G
B
209
210
204
205
206
203
COLUMN CIRCUIT
HORIZONTAL TRANSFER CIRCUIT
VERTICAL SCANNING CIRCUIT

FIG. 5

| GAIN | FD | COLUMN CIRCUIT GAIN | | TOTAL GAIN |
|---|---|---|---|---|
| | | COLUMN AMPLIFIER | Ramp | |
| FIRST GAIN | 1 | 1 | 1 | 1 |
| SECOND GAIN | 4 | 2 | 1 | 8 |

FIG. 6

| FD EXPANSION TRANSISTOR FDext | COLUMN CIRCUIT | GAIN | FD | COLUMN CIRCUIT GAIN | | TOTAL GAIN |
|---|---|---|---|---|---|---|
| | | | | COLUMN AMPLIFIER | Ramp | |
| ON | COLUMN CIRCUIT 204 | FIRST GAIN | 1 | 1 | 1 | 1 |
| | COLUMN CIRCUIT 210 | SECOND GAIN | 1 | 8 | 1 | 8 |
| OFF | COLUMN CIRCUIT 204 | SECOND GAIN | 4 | 2 | 1 | 8 |
| | COLUMN CIRCUIT 210 | THIRD GAIN | 4 | 16 | 1 | 64 |

IMAGE CAPTURING APPARATUS AND METHOD FOR CONTROLLING THE SAME

CROSS-REFERENCE TO RELATED APPLICATIONS

This application is a Continuation of International Patent Application No. PCT/JP2023/000153, filed Jan. 6, 2023, which claims the benefit of Japanese Patent Application No. 2022-028386, filed Feb. 25, 2022 and Japanese Patent Application No. 2022-159716, filed Oct. 3, 2022, all of which are hereby incorporated by reference herein in their entirety.

BACKGROUND OF THE INVENTION

Field of the Invention

The present invention relates to an image capturing apparatus and a method for controlling the same.

Background Art

In recent years, as image sensors of digital still cameras, digital video cameras, and the like, low power consumption image sensors suitable for high-speed read-out are widely used. In an image sensor, signals are read by transferring charges of photodiodes to a floating diffusion (referred to hereinafter as "FD") and converting them to voltages. At this time, if the capacitance of the FD is small, the amount of charges to be handled is small. On the other hand, if the capacitance of the FD is large, the gain of the conversion into a voltage is small and noise appears to be large.

In contrast, in order to allow an appropriate capacitance of an FD to be selected, PTL 1 proposes an image sensor having a function to switch the capacitance of the FD.

Also, PTL 2 proposes an image sensor that amplifies electric signals generated by photoelectric conversion elements at the same exposure, with different amplification ratios, and reads out the amplified signals, thereby improving the S/N ratio.

In image capturing apparatuses including such an image sensor, the S/N ratio can be improved by appropriately selecting and combining two amplified electrical signals or two digital signals subjected to analog-digital (AD)-conversion according to the luminance, into a single image.

Citation List

Patent Literature

PTL1: U.S. Pat. No. 7,427,790

PTL2: Japanese Patent Laid-Open No. 2021-168460

However, an image sensor having a function to switch the capacitance of an FD has the problem that, when amplifying electric signals generated by photoelectric conversion elements at the same exposure, with different amplification ratios, and outputting the amplified signals, switching the capacitance of the FD may deteriorate the signal read-out speed.

The present invention has been made in view of the above-described problem and provides an image capturing apparatus that can obtain an image having a favorable S/N ratio while suppressing a deterioration in the signal read-out speed, when amplifying electric signals generated by photoelectric conversion elements at the same exposure, with different amplification ratios, and outputting the amplified signals.

SUMMARY OF THE INVENTION

According to the present invention, there is provided an image capturing apparatus comprising: a pixel portion in which a plurality of pixels are arranged in a matrix, each of the pixels including a photoelectric conversion portion, a charge-voltage conversion portion configured to convert a charge of a signal transferred from the photoelectric conversion portion into a voltage, and an expansion portion configured to expand a capacitance of the charge-voltage conversion portion; a switching circuit configured to switch connection between the expansion portion and the charge-voltage conversion portion; and a read-out circuit configured to amplify signals of the same pixel with a plurality of types of amplification ratios and read out the amplified signals, wherein when the read-out circuit amplifies signals of the same pixel with a plurality of types of amplification ratios and reads out the amplified signals, the switching circuit configures the same settings of switching the connection between the expansion portion and the charge-voltage conversion portion, for reading out operations with the plurality of amplification ratios.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 5 is a diagram showing examples of a total gain when performing one image shooting instead of HDR shooting.

FIG. 6 is a diagram showing examples of a total gain when performing HDR shooting.

DESCRIPTION OF THE EMBODIMENTS

Figure 1:
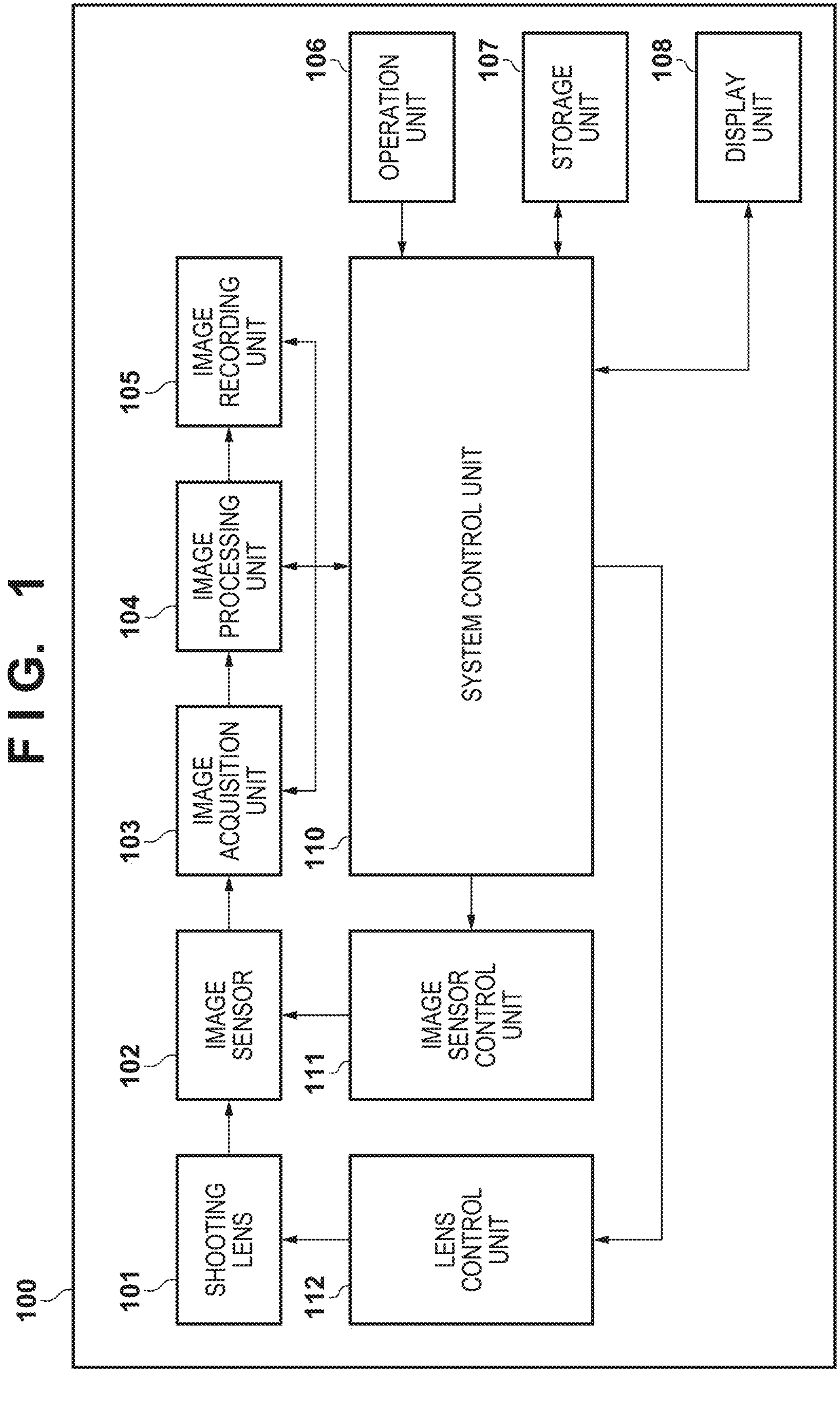
FIG. 1 is a block diagram showing a schematic configuration of an image capturing apparatus according to an embodiment of the present invention.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

FIG. 1 is a block diagram showing a schematic configuration of an image capturing apparatus 100, which is an embodiment of the image capturing apparatus of the present invention.

In FIG. 1, a shooting lens 101 is an interchangeable lens unit that can be attached to the main body of the image capturing apparatus 100, or a lens part built in the main body, and is constituted by multiple lens groups including a focus lens, a zoom lens, and the like, a diaphragm mechanism, and the like.

The image sensor 102 is a CMOS image sensor including a plurality of pixels and can be driven by at least two driving methods. One method is a driving method in which photoelectric conversion is performed on each of pixels of an optical image of a subject formed by the shooting lens 101 at one exposure (the same exposure) to generate a charge based on the amount of incident light, and image signals are output that are obtained by amplifying signals of the pixels with the same gain. The other method is a driving method in which a plurality of image signals are output that are obtained by amplifying signals of pixels obtained at one exposure (the same exposure), with multiple types of gains.

Also, the image sensor 102 has an electronic shutter function to adjust the amount of light incident on each pixel, such as a rolling shutter, and can control the exposure time for the subject image.

An image acquisition unit 103 temporarily holds image signals output from the image sensor 102 and performs photometric processing using the held image signals.

An image processing unit 104 performs various types of signal processing such as noise reduction processing, gamma processing, color signal processing, and exposure compensation processing on image signals held in the image acquisition unit 103, and outputs the processed image signals.

Also, the image processing unit 104 generates a high dynamic range (HDR) image using a suitable combining method. For example, there is a method in which image signals amplified with a high gain (amplification ratio) are used for an image portion having a predetermined signal level or less, and image signals amplified with a low gain (amplification ratio) are used for an image portion (bright and white-out image) having a signal level exceeding the predetermined level, and these image signals are combined. Note that in a normal image used for a signal in a dark portion of the combined image, random noise in the dark portion is preferably suppressed.

An image recording unit 105 records the image signals processed by the image processing unit 104 in a storage device or a storage medium. For example, a memory device mountable to the main body of the image capturing apparatus 100 is used as the storage device or the storage medium.

By operating an operation unit 106, a user can input various instructions to the image capturing apparatus 100. The operation unit 106 includes operation members such as a release button, a mode switching dial, and a zoom operation lever, and a touch panel. A user input via the operation unit 106 is given to a system control unit 110. By the user input via the operation unit 106, settings for HDR shooting are also given to the system control unit 110.

A storage unit 107 is a storage unit that stores, for example, content of user instructions given to the image capturing apparatus 100 and is composed of a non-volatile memory that is electrically erasable and recordable.

A display unit 108 can display a shot image and information thereof at the time of shooting, a user interface for operation using the operation unit 106, and the like, and is composed of a TFT-LCD, for example. The display unit 108 may also be composed of a touch panel and a user input that can be given through an operation via the operation unit 106 can also be input on the display unit 108.

A system control unit 110 controls an image sensor control unit 111 and a lens control unit 112, based on image signals and photometric results held in the image acquisition unit 103 and user inputs given through the operation unit 106.

The image sensor control unit 111 performs driving control on the image sensor 102 in accordance with a control signal from the system control unit 110. The lens control unit 112 performs driving control on the shooting lens 101 in accordance with a control signal from the system control unit 110.

Figure 2:
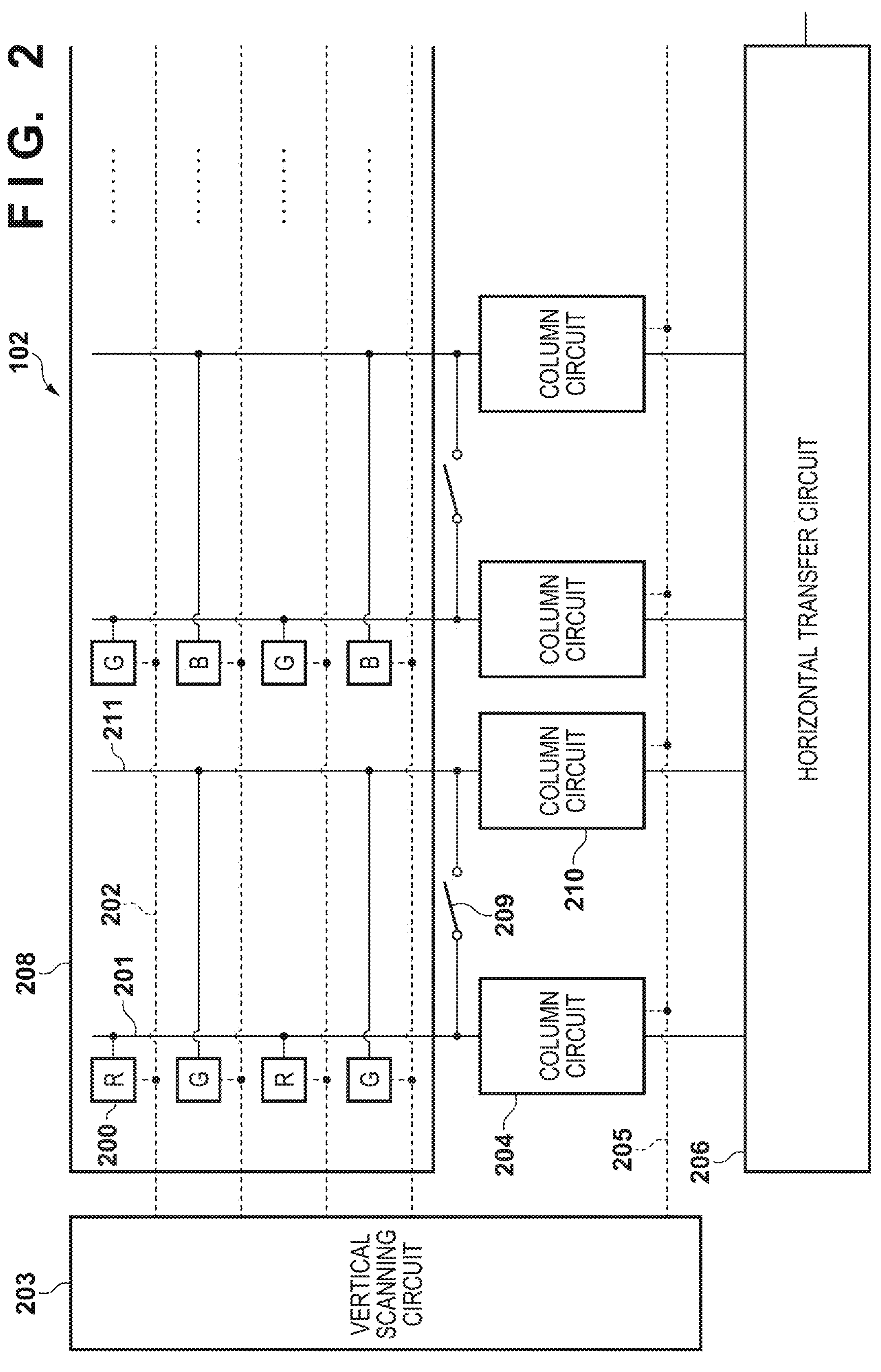
FIG. 2 is a diagram showing a configuration of an image sensor.

FIG. 2 is a block diagram showing a configuration of the image sensor 102 of the present embodiment.

A pixel area (pixel portion) 208 is configured such that a plurality of unit pixels 200 are arranged in a matrix. For ease of description, the present embodiment shows a configuration in which n pixels (n is a natural number of 2 or more) are arranged in the horizontal direction and 4 pixels are arranged in the vertical direction, but in reality, the matrix has a configuration in which large numbers of pixels are arranged in the respective horizontal and vertical directions.

Each of the unit pixels 200 is provided with an optical filter of one of a plurality of colors, and a video signal according to the color of the optical filter is acquired. In FIG. 2, "RGB" are denoted for unit pixels, namely, unit pixels provided with a red filter are R pixels, unit pixels provided with a green filter are G pixels, and unit pixels provided with a blue filter are B pixels. In this way, unit pixels each with an optical filter of one of the three color are arranged according to Bayer layout.

Drive pulses are transmitted from a vertical scanning circuit 203 to pixels in each row through a corresponding common drive signal line 202. Note that, for ease of description, one drive signal line 202 is shown for each row, but a plurality of drive signal lines may also be provided for each row.

Of unit pixels 200 in the same column, pixels in odd-numbered rows are connected to a column output line 201. Also, pixels in even-numbered rows are connected to a column output line 211. When a switch 209 is OFF, image signals from the odd-numbered rows are input only to a column circuit 204 via the column output line 201. When the switch 209 is ON, the image signals from the odd-numbered rows are input to both the column circuit 204 and the column circuit 210.

The same applies to image signals from the pixels in the even-numbered rows, and when the switch 209 is OFF, the image signals are input only to the column circuit 210 via the column output line 211. When the switch 209 is ON, the image signals from the even-numbered rows are input to both the column circuit 204 and the column circuit 210.

When the switch 209 is OFF, the image signals from the pixels in the even-numbered rows and the image signals from the pixels in the odd-numbered rows can be read out simultaneously, and when the switch 209 is ON, the image signals from the pixels in the even-numbered rows and the image signals from the odd-numbered rows are read out sequentially. Accordingly, when the switch 209 is turned from OFF to ON, the speed of reading out the image signals decreases. In the present embodiment, the switch 209 is turned OFF and used when performing one image shooting (shooting of a single image), and the switch 209 is turned ON and used when acquiring two images for HDR shooting.

The column circuit 204 and the column circuit 210 are connected to the vertical scanning circuit 203 via a column circuit signal line 205, which transmits column gain setting signals and other control signals, and perform processing for applying a gain to a signal from each unit pixel in accordance with an instruction from the image sensor control unit 111. When the switch 209 is OFF, the same gain is set for the column circuit 204 and the column circuit 210. On the other hand, when the switch 209 is ON, different gains are set for the column circuit 204 and the column circuit 210.

In the present embodiment, when performing one image shooting, control is performed such that the switch 209 is turned OFF and the same gain is set for the column circuit 204 and the column circuit 210, so that output signals are obtained that are amplified with the same gain (amplification ratio) for the pixels in the even-numbered rows and the pixels in the odd-numbered rows. Also, when performing HDR shooting, control is performed such that the switch 209 is turned ON and different gains required for HDR shooting are set for the column circuit 204 and the column circuit 210, so that output signals are obtained that are amplified with the different gains (amplification ratios) for the pixels in the even-numbered rows and the pixels in the odd-numbered rows.

Furthermore, the column circuit 204 and the column circuit 210 perform A/D conversion processing to output digital signals to a horizontal transfer circuit 206. The horizontal transfer circuit 206 outputs the input signals to the image acquisition unit 103.

Figure 3:
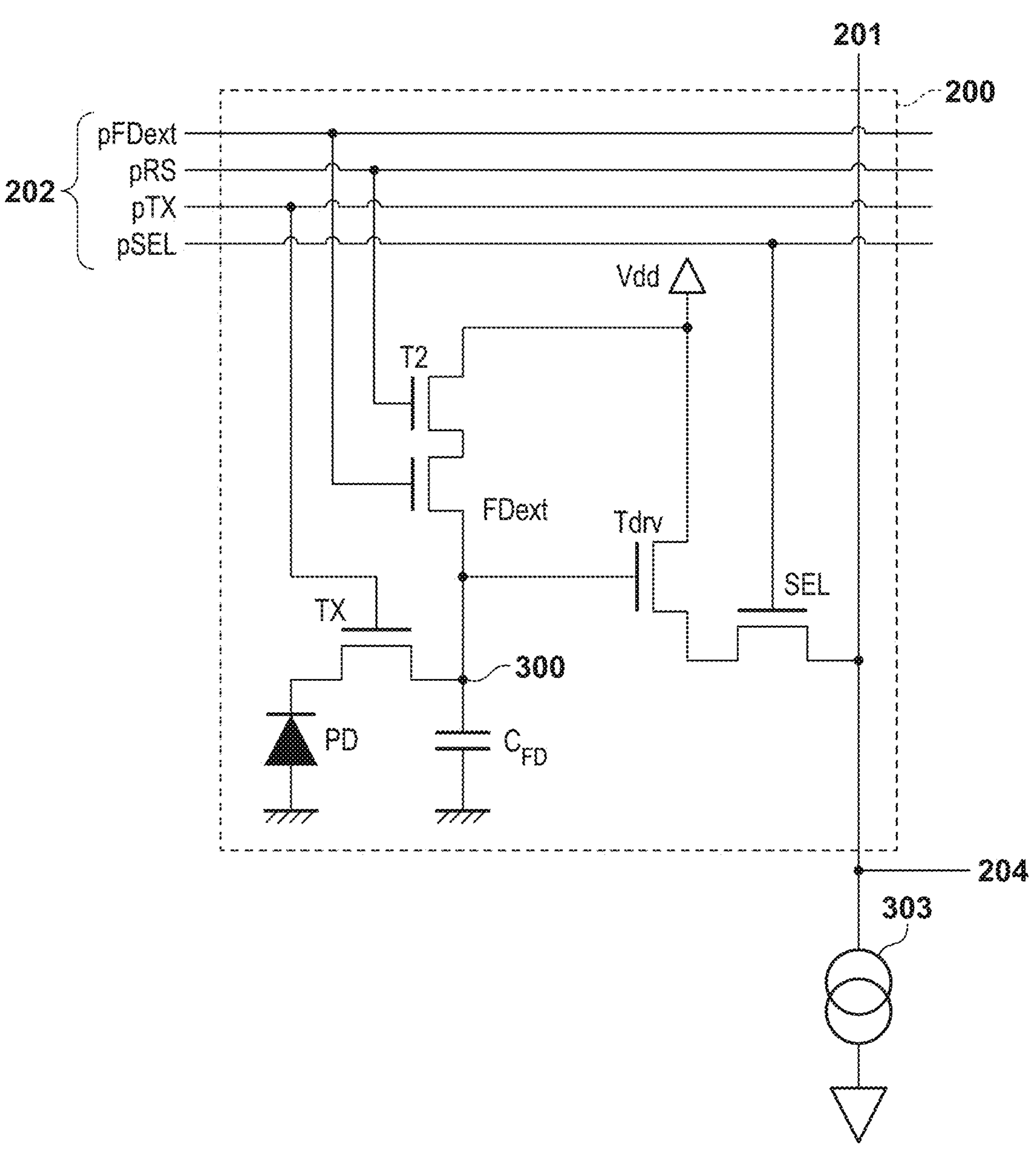
FIG. 3 is a diagram showing a circuit configuration of a pixel.

FIG. 3 is a diagram showing a circuit configuration of each unit pixel 200 of the image sensor 102. In FIG. 3, one of the multiple unit pixels 200 constituting the pixel area 208 is representatively shown in a dotted rectangle.

The unit pixel 200 is connected to another circuit via the drive signal line 202 and the column output line 201. The column output line 201 is connected to a current source 303 and the column circuit 204 and also connected to a plurality of unit pixels 200 arranged in the same column (vertical line of pixels), so as to transmit a pixel signal. The drive signal line 202 is connected to the vertical scanning circuit 203 and also connected to a plurality of unit pixels 200 arranged in the same row (horizontal line of pixels).

As a result of the vertical scanning circuit 203 controlling the unit pixels 200 in the same row simultaneously via the drive signal line 202, signal read-out from the unit pixels 200 and reset thereof are executed. Each of the drive signal lines 202 includes a transfer control line pTX, an FD expansion control line pFDext, a reset control line pRS, and a selection control line pSEL, which will be described later.

A photoelectric conversion element (photoelectric conversion portion) PD is a photodiode that converts incident light into a charge and accumulates the converted charge. In the photoelectric conversion element PD, the P side of the PN junction is grounded and the N side of the PN junction is connected to the source of a transfer transistor (transfer switch) TX.

The gate of the transfer transistor TX is connected to the transfer control line pTX, and the drain of the transfer transistor TX is connected to a floating diffusion (FD) capacitance CFD. The transfer transistor TX controls charge transfer from the photoelectric conversion element PD to the FD capacitance CFD.

One side of the FD capacitance CFD (charge-voltage conversion portion) is grounded and accumulates the charge while converting the charge transferred from the photoelectric conversion element PD into a voltage. Hereinafter, the connection point between the drain of the transfer transistor TX and the other side (non-grounded side) of the FD capacitance CFD is referred to as an FD node 300.

An FD expansion transistor (FD expansion portion) FDext is a MOS transistor whose gate is connected to the FD expansion control line pFDext, whose source is connected to the FD capacitance CFD, and whose drain is connected to a reset transistor (reset switch) T2.

The gate of the reset transistor T2 is connected to the reset control line pRS, the drain of the reset transistor T2 is connected to a power supply voltage Vdd, and the source of the reset transistor T2 is connected to the FD expansion transistor FDext.

When the FD expansion transistor FDext and the reset transistor T2 are set to an ON state, the potential of the FD node 300 is reset to the power supply voltage Vdd. On the other hand, when both the FD expansion transistor FDext and the reset transistor T2 are in an OFF state, the charge transferred from the photoelectric conversion element PD is converted into a voltage by the FD capacitance CFD.

When the FD expansion transistor FDext is in the ON state and the reset transistor T2 is in the OFF state, the FD expansion transistor FDext functions as an accumulation portion (that is, accumulation capacitance) capable of accumulating the charge. The accumulation capacitance is hereinafter referred to as a "FD expansion capacitance Cex". In this case, because the accumulation capacitance of the FD expansion transistor FDext and the FD capacitance CFD are grounded parallel to the substrate, the capacitance viewed from the FD node 300 is a capacitance CFDadd obtained by adding the FD expansion capacitance Cex to the FD capacitance CFD.

Accordingly, at the FD node 300, the charge transferred from the photoelectric conversion element PD is converted into a voltage, using the summed capacitance CFDadd, which is the sum of the FD capacitance CFD and the FD expansion capacitance Cex.

The driving transistor (amplification portion) Tdrv is a transistor that constitutes an in-pixel amplifier, and whose gate is connected to the FD capacitance CFD, whose drain is connected to the power supply voltage Vdd, and whose source is connected to the selection transistor SEL. Accordingly, the driving transistor Tdrv outputs a voltage that corresponds to the voltage of the FD capacitance CFD.

The gate of the selection transistor SEL is connected to the selection control line pSEL, and the source of the selection transistor SEL is connected to the column output line 201. The selection transistor SEL outputs, to the column output line 201, an output of the driving transistor Tdrv as an output signal (pixel signal) of the unit pixel 200.

The current source 303 constitutes, together with the driving transistor Tdrv for driving the unit pixels 200 in the column to which the column output line 201 is connected, a source follower circuit, which functions as the in-pixel amplifier.

In the present embodiment, transistors other than the driving transistor Tdrv and the current source 303 function as switches, and are configured to conduct (be turned ON) when a signal on the control line connected to their gate is High and interrupt (be turned OFF) when the signal is Low.

The following will describe how to use the FD expansion transistor FDext when shooting one image without performing HDR shooting.

As described above, when shooting one image, in FIG. 2, the switch 209 is turned OFF and the same gain is set for the column circuit 204 and the column circuit 210. If a first gain, which has a relatively low amplification ratio, is set for the column circuit 204 and the column circuit 210, the FD expansion transistor FDext is turned ON so that a larger amount of charge can be accumulated to secure a target dynamic range.

On the other hand, if a gain that can secure the target dynamic range is set, the FD expansion transistor FDext is turned OFF to reduce noise. For example, if a second gain, which has an amplification ratio greater than that of the first gain and can secure the target dynamic range, or a third gain, which has an amplification ratio greater than that of the second gain, is set, the FD expansion transistor FDext is turned OFF.

In this way, when no HDR shooting is performed, the FD expansion transistor FDext is switched between ON and OFF according to the gain of the same value set for the column circuit 204 and the column circuit 210.

Figure 4:
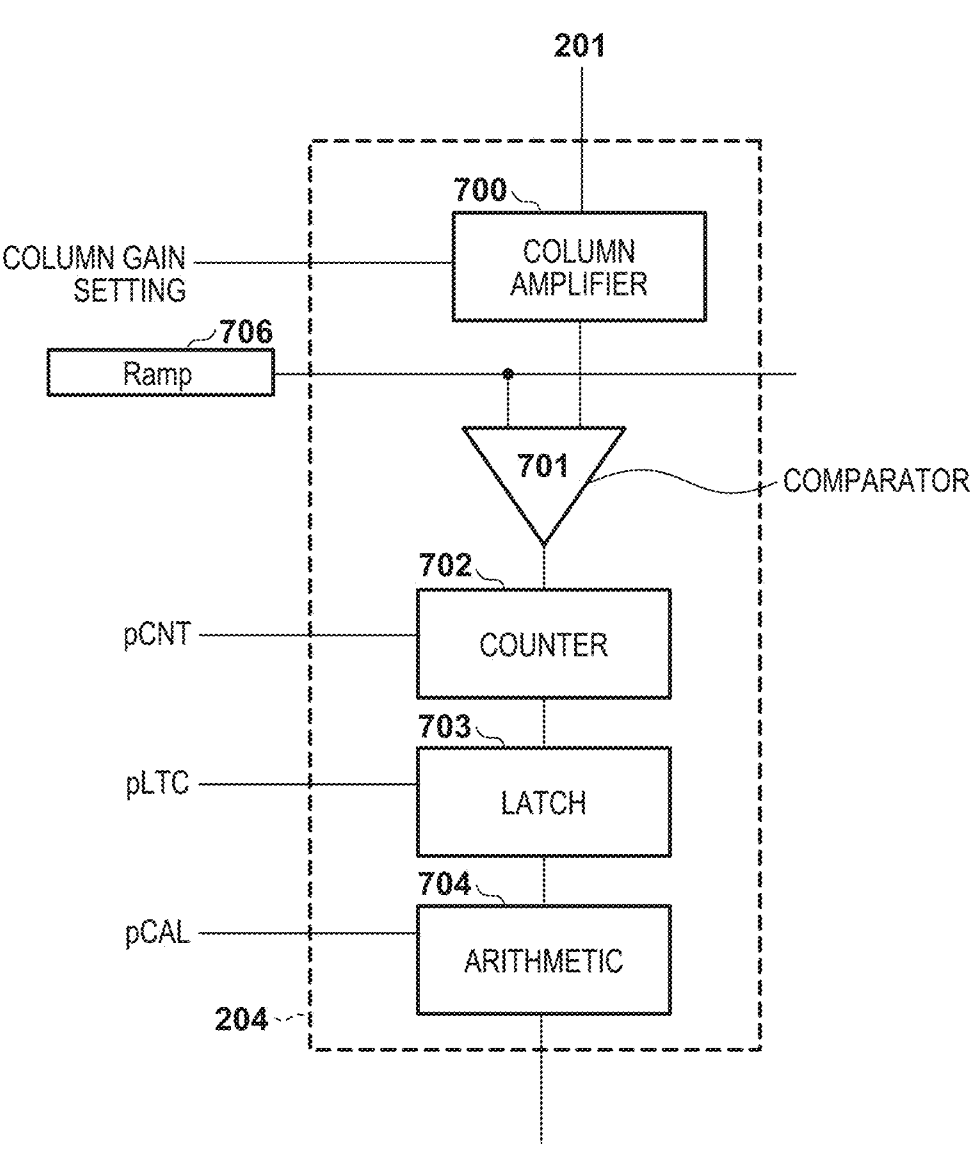
FIG. 4 is a circuit diagram showing a circuit configuration of a column circuit.

FIG. 4 is a circuit diagram showing a circuit configuration of the column circuit 204. Since the column circuit 210 has the same circuit configuration as that of the column circuit 204, the following will describe the configuration of the column circuit 204, as a representative example.

The column circuit 204 includes a column amplifier 700, a comparator 701, a counter circuit 702, a latch circuit 703, and an arithmetic circuit 704. A ramp signal generating portion 706 (hereinafter, referred to as "RAMP") is a circuit that generates a ramp signal varying with respect to time. The column amplifier 700 is an amplifier that amplifies an output signal (pixel signal) of a unit pixel 200 output to the column output line 201.

The comparator 701 compares the ramp signal generated by the ramp signal generating portion 706 with an output of the column amplifier 700, and outputs an inversion signal at a timing at which the ramp signal varying with respect to time matches the pixel output.

The counter circuit 702 performs counting operation based on clocks supplied from a connected counter control line pCNT. The counter circuit 702 starts the counting operation at a timing at which the comparator 701 starts comparing the pixel signal with the ramp signal, and outputs a count value at a timing at which the output of the comparator 701 is inverted.

The latch circuit 703 temporarily holds the count value output by the counter circuit 702 and outputs the held count value based on control via a connected latch control line pLTC.

The arithmetic circuit 704 stores the count value output by the latch circuit 703 as a digital signal of the pixel based on control via a connected arithmetic control line pCAL. In addition, the arithmetic circuit 704 outputs the stored digital signal of the pixel. The comparator 701, the counter circuit 702, the latch circuit 703, the arithmetic circuit 704, and the RAMP 706 constitute an A/D converter.

The following will describe gain settings in the column circuit 204. The same applies to the column circuit 210. The column amplifier 700 of the column circuit 204 can amplify output signals (pixel signals) of the unit pixels 200 output to the column output line 201, with multiple different gains. The column amplifier 700 amplifies the pixel signals with gains set in a later-described manner, and the amplified pixel signals are input to the comparator 701.

Note that pixel signals may be amplified with different gains at the time of A/D conversion by not only the column amplifier 700 but also a downstream A/D converter changing the time change of a ramp signal. In other words, if time change of a ramp signal is slow, inversion of the output of comparator 701 will be delayed, resulting in an increase in the count value. Since the speed of time change of a ramp signal corresponds to the amplification rate of an output signal of a unit pixel 200, this is referred to as a RAMP gain, and the RAMP gain can be switched by changing the level of time change.

The following will describe, with reference to FIG. 5, examples of total gains of amplifiers other than the column circuit 204 when performing one image shooting instead of HDR shooting.

In the present embodiment, an example is described in which a second total gain is 8 times as large as a first total gain. Also, an example is described in which the FD expansion capacitance Cex is 3 when the FD capacitance CFD is 1.

In this case, the capacitance CFDadd, which is the sum of the FD capacitance CFD and the FD expansion capacitance Cex, is 4, and the conversion gain (hereinafter referred to as "FD gain") of the charge voltage conversion in this case is one time as large as the standard. When the first total gain is set, the FD expansion transistor FDext is turned ON and the capacitance CFDadd is set to 4, and when the second total gain is set, the FD expansion transistor FDext is turned OFF. As a result, the gain difference of the second total gain from the first total gain due to the FD capacitance is equal to a factor of 4.

Although the column circuit 204 and the column circuit 210 are configured to allow pixel signals to be amplified with different gains by the column amplifier 700 or the A/D converter, in the present embodiment, it is assumed that the RAMP gain of the A/D converter is equal to a factor of 1 regardless of whether the first total gain or the second total gain is set. Note that the A/D converter may have different RAMP gains between the first total gain and the second total gain.

It is assumed that when the first total gain (total gain of a factor of 1) is set, the gains of the column amplifiers 700 of the column circuit 204 and the column circuit 210 are both equal to a factor of 1. It is also assumed that when the second total gain (total gain of a factor of 8) is set, the gains of the column amplifiers 700 of the column circuit 204 and the column circuit 210 are both equal to a factor of 2, so that, together with the above-described gain difference of a factor of 4 due to the FD capacitance, the second total gain is 8 times as large as the first total gain.

Thus, the second total gain is 8 times as large as the first total gain (the FD gain of a factor of 4 and the gains of the column amplifiers 700 of a factor of 2, resulting in the total gain of a factor of 8).

The following will describe how to use the FD expansion transistor FDext when acquiring two images for HDR shooting.

As described above, when performing HDR shooting, in FIG. 2, control is performed such that the switch 209 is turned ON and different gains required for HDR shooting are set for the column circuit 204 and the column circuit 210, so that output signals amplified with multiple gains are obtained.

Here, with respect to the amplification ratios of the column circuit 204 and the column circuit 210, an amplification ratio that cannot ensure the target dynamic range unless the FD expansion transistor FDext is ON is defined as the first gain. Also, an amplification ratio that is greater than the first gain and that can ensure the target dynamic range even if the FD expansion transistor FDext is OFF is defined as the second gain. An amplification ratio that is even larger than the second gain is defined as the third gain. The following will describe a case where one of these first to third gains is applied to the column circuit 204 and the column circuit 210.

In one image shooting without performing HDR shooting, the FD expansion transistor FDext is set to ON for the first gain, and the FD expansion transistor FDext is set to OFF for the second and third gains.

In HDR shooting, a case is taken into consideration in which the first gain is set for the column circuit 204 and the second gain is set for the column circuit 210. In this case, if the FD expansion transistor FDext is tried to be switched ON and OFF as in the one image shooting, an output signal of the same unit pixel 200 cannot be read out simultaneously to the column circuit 204 and the column circuit 210.

Accordingly, a pixel signal when the FD expansion transistor FDext is turned ON is read out to the column circuit 204, and then a pixel signal when the FD expansion transistor FDext is turned OFF is read out to the column circuit 210, resulting in an increase in the readout time.

Therefore, in the present embodiment, in HDR shooting, where the electrical signals generated by photoelectric conversion elements at the same exposure are amplified with multiple different gains (amplification ratios) and the amplified signals are read out, the same operation settings of the FD expansion transistor FDext are set. Also, pixel signals are read out simultaneously to the column circuit 204 and the column circuit 210, thereby avoiding a reduction in the read-out speed.

Note that when the second gain is set for the column circuit 204 and the third gain is set for the column circuit 210, the FD expansion transistor FDext is set to OFF as in the one image shooting. Therefore, the setting of the FD expansion transistor FDext does not change between HDR shooting and one image shooting.

The following will describe, with reference to FIG. 6, examples of total gains of amplifiers other than the column circuit 204 when performing HDR shooting.

In the present embodiment, an example is described in which two images with total gains different from each other by a factor of 8 are simultaneously shot during HDR shooting.

With reference to the first total gain of a factor of 1, the second total gain is set to a factor of 8 and the third total gain is set to a factor of 64, and images with the first total gain (a factor of 1) and the second total gain (a factor of 8) are simultaneously shot. Alternatively, images with the second total gain (a factor of 8) and the third total gain (a factor of 64) are simultaneously shot. With this, two images with total gains different from each other by a factor of 8 can be obtained. Note here that an example is described in which the FD expansion capacity Cex is 3 when the FD capacitance CFD is 1.

When images with the first total gain (a factor of 1) and the second total gain (a factor of 8) are simultaneously shot, the FD expansion transistor FDext are turned ON for both images, and the FD gain is set to a factor of 1.

Although the column circuit 204 and the column circuit 210 are configured to allow pixel signals to be amplified with different gains by the column amplifier 700 or the A/D converter, in the present embodiment, it is assumed that the RAMP gain of the A/D converter is equal to a factor of 1 regardless of whether the first total gain, the second total gain, or the third total gain is set. Note that different RAMP gains of the A/D converter may be set for the first total gain, the second total gain, and the third total gain.

Also, when the first total gain (a factor of 1) is set, the gain of the column amplifier 700 of the column circuit 204 is set to a factor of 1. When the second total gain (a factor of 8) is set, the gain of the column amplifier 700 of the column circuit 210 is set to a factor of 8.

With this, images with the first total gain (a factor of 1) and the second total gain (a factor of 8) can be shot simultaneously.

The following will describe a case where images with the second total gain and the third total gain are simultaneously shot.

When images with the second total gain (a factor of 8) and the third total gain (a factor of 64) are simultaneously shot, the FD expansion transistor FDext are turned OFF for both images, and the FD gain is set to a factor of 4.

Also, when the second total gain (a factor of 8) is set, the gain of the column amplifier 700 of the column circuit 204 is set to a factor of 2. When the third total gain (a factor of 64) is set, the gain of the column amplifier 700 of the column circuit 210 is set to a factor of 16.

With this, images with the second total gain (a factor of 8) and the third total gain (a factor of 64) can be shot simultaneously.

The following will describe settings of the FD extension transistor FDext in HDR shooting, and a relationship between an exposure determination method and a combining method of two images. The following describes settings in which the S/N ratio of high luminance is prioritized, settings in which the S/N ratio of low luminance is prioritized, and settings in which the S/N ratios of both high and low luminance are prioritized.

First, settings in which the S/N ratio of high luminance is prioritized are described with reference to FIG. 7.

In HDR shooting in which the S/N ratio of high luminance is prioritized, the FD expansion transistor FDext is turned ON. Also, the amount of aperture opening and exposure time of the image sensor 102 are set by the lens control unit 112 so that image signals amplified by the column circuit 210 for which the second gain, which has a relatively large amplification ratio, is set have a correct exposure. In this case, image signals amplified by the column circuit 204 for which the first gain, which has a relatively small amplification ratio, is set have an underexposure.

Figure 7:
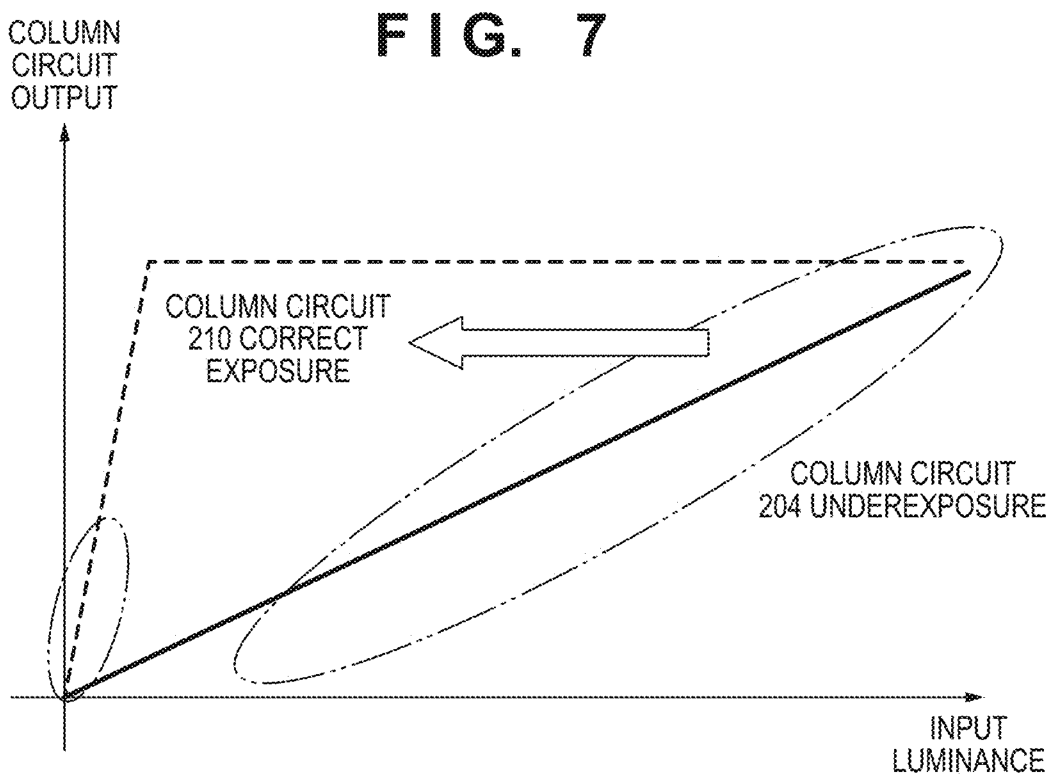
FIG. 7 is a diagram showing input/output characteristics of the image sensor.

In FIG. 7, the horizontal axis indicates the amount of light of a subject incident on the image sensor, that is, input luminance, and the vertical axis indicates the output value of the column circuits. By setting the FD expansion transistor FDext to ON, a larger amount of charges can be accumulated in the FD unit, and thus the subject with high input luminance can be shot since the gain set for the column circuit 204 is lower than the gain set for the column circuit 210.

The image signals amplified by the column circuit 204 and the image amplified by the column circuit 210 are combined by the image processing unit 104 based on the image signals in the respective ranges enclosed by the ellipses. By combining a low-luminance portion of the correct exposure image, which has the image signals amplified by the column circuit 210, and a high-luminance portion of the underexposed image, which is obtained by gamma-correcting the image signals amplified by the column circuit 204, it is possible to extend the dynamic range on the high-luminance side and improve the S/N ratio.

Figure 8:
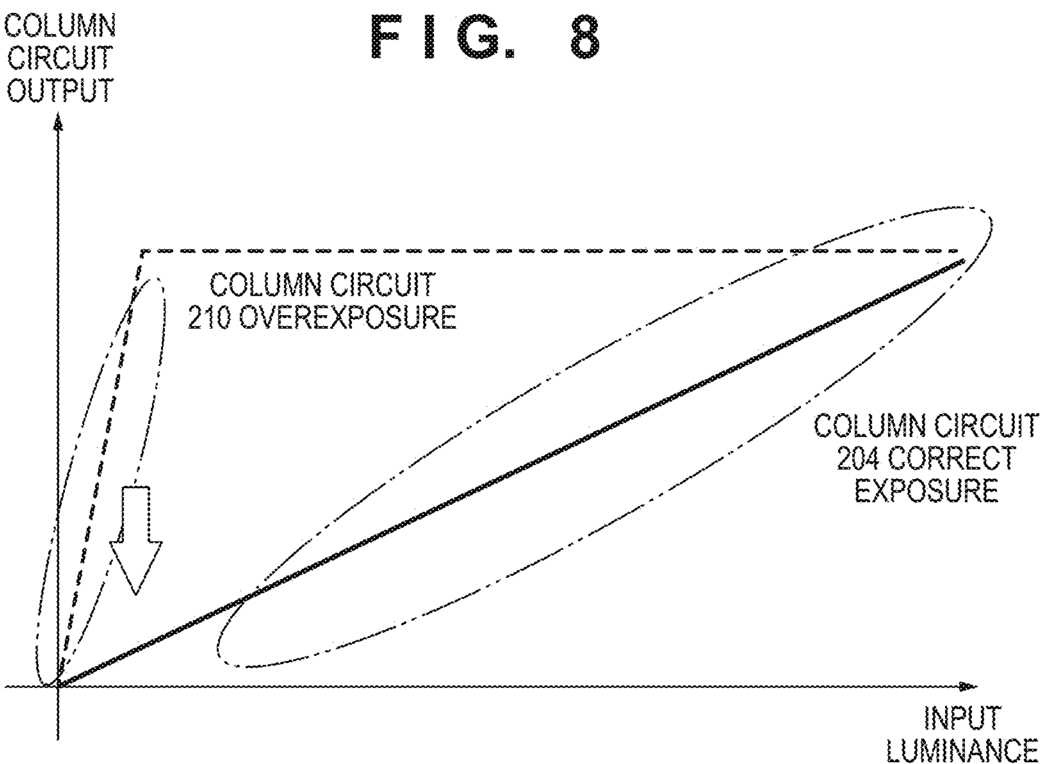
FIG. 8 is a diagram showing input/output characteristics of the image sensor.

Then, settings in which the S/N ratio of low luminance is prioritized are described with reference to FIG. 8.

In HDR shooting in which the S/N ratio of low luminance is prioritized, the FD expansion transistor FDext is turned ON. Also, the amount of aperture opening and exposure time of the image sensor 102 are set by the lens control unit 112 so that image signals amplified by the column circuit 204 for which the first gain, which has a relatively small amplification ratio, is set have a correct exposure. In this case, image signals amplified by the column circuit 210 for which the second gain, which has a relatively large amplification ratio, is set have an overexposure.

By setting the FD expansion transistor FDext to ON, a larger amount of charges can be accumulated in the FD unit, and thus the subject with high input luminance can be shot since the gain set for the column circuit 204 is lower than the gain set for the column circuit 210.

The image signals amplified by the column circuit 204 and the image signals amplified by the column circuit 210 are combined by the image processing unit 104 using the pixel signals in the respective ranges enclosed by the ellipses. By performing correction for reducing the gain of the overexposed image, which has the image signals amplified by the column circuit 210, so that it has an exposure corresponding to the correct exposure, it is possible to obtain an image with less noise. By combining the low-noise image and the high-luminance portion of the correct exposure image, which has the image signals amplified by the column circuit 204, it is possible to improve the S/N ratio on the low luminance side.

Figure 9:
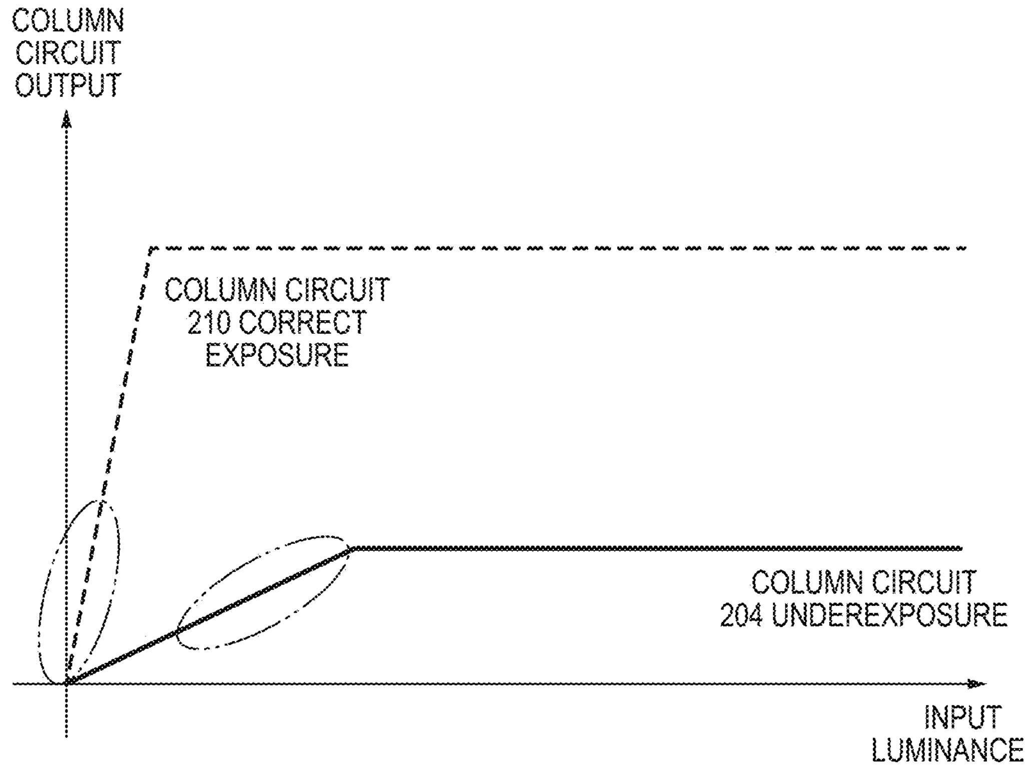
FIG. 9 is a diagram showing input/output characteristics of the image sensor.

Then, settings in which the S/N ratios of both high and low luminance are prioritized are described with reference to FIG. 9.

In HDR shooting in which the S/N ratios of both high and low luminance are improved, the FD expansion transistor FDext is turned OFF.

Also, the amount of aperture opening and exposure time of the image sensor 102 are set by the lens control unit 112 so that image signals amplified by the column circuit 210 for which the second gain, which has a relatively large amplification ratio, is set have a correct exposure. In this case, image signals amplified by the column circuit 204 for which the first gain, which has a relatively small amplification ratio, is set have an underexposure.

By setting the FD expansion transistor FDext to OFF, an image with less noise can be obtained than when the FD expansion transistor FDext is set to ON. On the other hand, since the amount of accumulated charges is reduced, the underexposed image, which has the image signals amplified by the column circuit 204, cannot indicate the subject with higher luminance than in the configuration described in FIG. 4.

However, by combining a low-luminance portion of the correct exposure image, which has the image signals amplified by the column circuit 210, and a high-luminance portion of the underexposed image, which is obtained by gamma-correcting the image signals amplified by the column circuit 204, it is possible to shoot images with improved S/N ratios for both low and high luminance.

Note that the present embodiment has described an example in which when performing HDR shooting, the gains of the column amplifiers 700 of the column circuit 204 and the column circuit 210 have a gain difference of a factor of 8, but the gains of the RAMP 706 may have the gain difference.

The method for controlling the image capturing apparatus to improve the S/N ratio of high luminance or low luminance, and the S/N ratios of both high and low luminance have been described. Note that a configuration is also possible in which the luminance for which the S/N ratio is desired to be improved is determined according to the luminance of an image captured by the image capturing apparatus, and the control is switched.

According to the present invention, it is possible to obtain an image having a favorable S/N ratio while suppressing a deterioration in the signal read-out speed, when amplifying electric signals generated by photoelectric conversion elements at the same exposure, with different amplification ratios, and outputting the amplified signals.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image capturing apparatus comprising:

a pixel portion in which a plurality of pixels are arranged in a matrix, each of the pixels including a photoelectric conversion portion, a charge-voltage conversion portion configured to convert a charge of a signal transferred from the photoelectric conversion portion into a voltage, and an expansion portion configured to expand a capacitance of the charge-voltage conversion portion;

a switching circuit configured to switch connection between the expansion portion and the charge-voltage conversion portion; and a read-out circuit configured to amplify signals of the a same pixel with a plurality of types of amplification ratios and read out the amplified signals, wherein when the read-out circuit amplifies signals of the same pixel with the plurality of types of amplification ratios and reads out the amplified signals, the switching circuit makes the connection state between the expansion portion and the charge-voltage conversion portion the same, for reading out operations with the plurality of amplification ratios, and sets the expansion portion and the charge-voltage conversion portion to be connected with each other if an S/N ratio of the image to be captured is prioritized.

2. The image capturing apparatus according to claim 1, wherein when the read-out circuit amplifies signals of the same pixel with a single amplification ratio and reads out the amplified signals, the switching circuit switches the connection between the expansion portion and the charge-voltage conversion portion according to the amplification ratio.

3. The image capturing apparatus according to claim 2, wherein when the read-out circuit amplifies signals of the same pixel with the plurality of types of amplification ratios and reads out the amplified signals, the switching circuit makes the connection state between the expansion portion and the charge-voltage conversion portion different from when the read-out circuit amplifies signals of the same pixel with the single amplification ratio and reads out the amplified signals.

4. The image capturing apparatus according to claim 1, wherein when the read-out circuit amplifies signals of the same pixel with the plurality of types of amplification ratios and reads out the amplified signals, the switching circuit connects the expansion portion and the charge-voltage conversion portion.

5. The image capturing apparatus according to claim 1, wherein when the read-out circuit amplifies signals of the same pixel with the plurality of types of amplification ratios and reads out the amplified signals, the switching circuit disconnects the expansion portion and the charge-voltage conversion portion.

6. The image capturing apparatus according to claim 1, wherein when the read-out circuit amplifies signals of the same pixel with the plurality of types of amplification ratios and reads out the amplified signals, the switching circuit changes the connection state between the expansion portion and the charge-voltage conversion portion according to a luminance of an image to be captured.

7. The image capturing apparatus according to claim 1, wherein the switching circuit sets so that the expansion portion and the charge-voltage conversion portion are connected to each other if an S/N ratio of high luminance of the image to be captured is prioritized.

8. The image capturing apparatus according to claim 7, wherein if the S/N ratio of high luminance of the image to be captured is prioritized, the switching circuit sets so that the expansion portion and the charge-voltage conversion portion are connected to each other, and the pixel portion is exposed in a manner such that an image with the largest amplification ratio, among the plurality of types of amplification ratios, has a correct exposure.

9. The image capturing apparatus according to claim 1, wherein the switching circuit sets so that the expansion portion and the charge-voltage conversion portion are connected to each other if an S/N ratio of low luminance of the image to be captured is prioritized.

10. The image capturing apparatus according to claim 9, wherein if the S/N ratio of low luminance of the image to be captured is prioritized, the switching circuit sets so that the expansion portion and the charge-voltage conversion portion are connected to each other, and the pixel portion is exposed in a manner such that an image with the smallest amplification ratio, among the plurality of types of amplification ratios, has a correct exposure.

11. The image capturing apparatus according to claim 1, wherein the switching circuit sets so that the expansion portion and the charge-voltage conversion portion are not connected to each other if S/N ratios of both high and low luminance of the image to be captured is to be improved.

12. The image capturing apparatus according to claim 11, wherein if the S/N ratios of both high and low luminance of the image to be captured is to be improved, the switching circuit sets so that the expansion portion and the charge-voltage conversion portion are not connected to each other, and the pixel portion is exposed in a manner such that an image with the largest amplification ratio, among the plurality of types of amplification ratios, has a correct exposure.

13. A method for controlling an image capturing apparatus including a pixel portion in which a plurality of pixels are arranged in a matrix, each of the pixels including:

a photoelectric conversion portion; a charge-voltage conversion portion configured to convert a charge of a signal transferred from the photoelectric conversion portion; and an expansion portion configured to expand a capacitance of the charge-voltage conversion portion, the method comprising:

switching connection between the expansion portion and the charge-voltage conversion portion; and amplifying signals of a same pixel with a plurality of types of amplification ratios and reading out the amplified signals, wherein in the switching, when signals of the same pixel are amplified with the plurality of types of amplification ratios and are read out in the reading-out, the connection state between the expansion portion and the charge-voltage conversion portion is made the same for reading out operations with the plurality of amplification ratios, and the expansion portion and the charge-voltage conversion portion are set to be connected with each other if an S/N ratio of the image to be captured is prioritized.

* * * * *